US010554077B2

United States Patent
Gray

(10) Patent No.: US 10,554,077 B2
(45) Date of Patent: Feb. 4, 2020

(54) AUTOMATED MONITORING FOR CHANGES IN ENERGY CONSUMPTION PATTERNS

(75) Inventor: Anthony R. Gray, Victoria (CA)

(73) Assignee: SCHNEIDER ELECTRIC USA, INC., Palatine, IL (US)

( * ) Notice: Subject to any disclaimer, the term of this patent is extended or adjusted under 35 U.S.C. 154(b) by 965 days.

(21) Appl. No.: 13/324,132

(22) Filed: Dec. 13, 2011

(65) Prior Publication Data

US 2013/0151179 A1 Jun. 13, 2013

(51) Int. Cl.
 *H02J 13/00* (2006.01)
(52) U.S. Cl.
 CPC .................. *H02J 13/0096* (2013.01)
(58) Field of Classification Search
 CPC . G06Q 90/00; G06F 15/00; G06F 1/28; H02J 13/0096
 USPC .......................................................... 702/62
 See application file for complete search history.

(56) References Cited

U.S. PATENT DOCUMENTS

| 4,344,142 A * | 8/1982 | Diehr, II ............. B29C 35/0288 264/325 |
| 4,644,320 A | 2/1987 | Carr et al. |
| 6,785,592 B1 | 8/2004 | Smith et al. |
| 7,881,889 B2 | 2/2011 | Barclay et al. |
| 8,090,696 B2 * | 1/2012 | Gouttas et al. ............... 707/694 |
| 8,280,657 B2 * | 10/2012 | Van Gorp et al. ............. 702/61 |
| 8,335,661 B1 * | 12/2012 | Satish .......................... 702/186 |
| 8,653,968 B2 * | 2/2014 | Brown et al. ............... 340/539.3 |
| 2003/0171851 A1 | 9/2003 | Brickfield et al. |
| 2005/0090995 A1 | 4/2005 | Sonderegger |
| 2006/0155514 A1 * | 7/2006 | Drouart et al. ............... 702/182 |
| 2006/0167591 A1 * | 7/2006 | McNally ....................... 700/291 |
| 2007/0018852 A1 | 1/2007 | Seitz |
| 2007/0239317 A1 | 10/2007 | Bogolea et al. |
| 2009/0125825 A1 | 5/2009 | Rye et al. |
| 2009/0228406 A1 * | 9/2009 | Lopez et al. .................. 705/412 |
| 2009/0289809 A1 | 11/2009 | Gray et al. |
| 2010/0010679 A1 | 1/2010 | Kassel |
| 2010/0286937 A1 | 11/2010 | Hedley et al. |
| 2011/0046804 A1 | 2/2011 | Fong et al. |

(Continued)

FOREIGN PATENT DOCUMENTS

| CN | 101251291 | 8/2008 |
| JP | 2002-051463 | 2/2002 |

OTHER PUBLICATIONS

US Supreme Court Decision (Alice vs CLS Bank) (2013).*

(Continued)

*Primary Examiner* — Hyun D Park
(74) *Attorney, Agent, or Firm* — Lando & Anastasi, LLP

(57) ABSTRACT

A process for detecting statistically significant changes in energy consumption patterns by monitoring for changes in the parameters to a parametric energy model. Two parametric models of energy consumption are created: the first being a model providing an initial base line of energy consumption, the second being a test model to be compared to the initial base model. Statistically significant changes are detected by using a difference score that compares the parameters of two models along with the uncertainties of each parameter to determine whether the differences in the parameters of each model indicate a statistically significant deviation in the energy consumption pattern.

25 Claims, 9 Drawing Sheets

(56) References Cited

U.S. PATENT DOCUMENTS

2011/0061015 A1    3/2011  Drees et al.
2011/0066299 A1*   3/2011  Gray et al. .................... 700/291
2011/0251933 A1*  10/2011  Egnor et al. ................... 705/30

OTHER PUBLICATIONS

Jeff S. Haberl, Ph.D., P.E., Ashrae's Guideline 14-2002 for Measurement of Energy and Demand Savings: How to Determine What was Really Saved by the Retrofit; Dated Oct. 2005 (13 pages).

Kelly Kissock and John Seryak; Understanding Manufacturing Energy Use Through Statistical Analysis; Dated 2004 (11 pages).

ION EEM Application Notes—Modeling, Aug. 2009; Dated: 2009 (33 pages).

Example Applications of Models in ION EEM; Dated 2007 (6 pages).

International Search Report corresponding to co-pending International Patent Application Serial No. PCT/US12/67313, United States Patent Office, dated Apr. 26, 2013; (3 pages).

International Written Opinion corresponding to co-pending International Patent Application Serial No. PCT/US12/67313, United States Patent Office, dated Apr. 26, 2013; (7 pages).

\* cited by examiner

AUTOMATED MONITORING FOR CHANGES IN ENERGY CONSUMPTION PATTERNS

FIELD OF THE INVENTION

The present disclosure relates generally to electrical utility monitoring systems, and, more particularly, to a system and method of monitoring changes in patterns of energy consumption by automatically generating models of energy consumption that are compared with a baseline model to identify statistically significant deviations from the baseline model.

BACKGROUND

Physical systems, such as an electrical utility system or a heating, ventilation, and air conditioning (HVAC) system, may be monitored by a network of intelligent electronic devices ("IEDs") coupled to a computer and/or server for monitoring various parameters or characteristics of the physical system. In addition to monitoring these systems, the physical systems may be modeled mathematically in a number of ways. Generally, the models take one or more observable qualities of the physical system that can be measured or observed and predict a numerical characterization of some other quality of the system that is thought to be causally influenced by the observed qualities. The observable qualities of the physical system that can be measured or observed are referred to as "driver variables," or "independent variables." The quality of the system that is thought to be causally influenced by the driver variables is called the "modeled variable," or "dependent variable." One approach to modeling a physical system is by the use of a linear model built using regression analysis on historical data from the system (hereinafter "regression model"), which computes a predicted quantity as a linear combination of scaled input quantities.

Energy consumption may be a cost driver in these types of physical systems. A producer of goods that is able to monitor its energy consumption, and thus its energy costs, is able to take steps to manage its energy consumption by making adjustments to its energy consumption (e.g., by modifying its physical installation to more efficiently consume energy with new windows, insulation, door seals, and the like, by adjusting working days to require less heating/cooling, etc.). Effective modeling can also provide verification that a proposed change in practices or equipment that influences energy consumption (e.g., modification to physical installation) has achieved the change in energy consumption desired. In addition, effective modeling can provide guidance on cost effectiveness of particular changes in energy consumption in order to target a producer's energy consumption management toward the most effective proposed changes. Thus, the more efficiently a producer of goods (or any other energy consumer) is able to monitor its energy consumption, the more efficiently the producer is able to manage energy consumption and energy costs, and thereby achieve a lower overall cost of producing the good.

Linear models can be used to model energy consumption as a function of one or more independent variables (driver variables). A simple linear model for a single independent variable has the form: $y=mx+b$, for example. A linear model with multiple independent variables can have the form: $y=m_1 x+m_2 z+\ldots+b$. Furthermore models of energy consumption patterns can be generated using a piecewise linear model, such as a changepoint model, in order to roughly account for non-linear behavior in an energy consumption pattern with respect to the driver variables.

SUMMARY

The systems, methods, and computer program products of the present disclosure accurately and efficiently monitor, model, and/or manage consumption of an energy load using computer models. The energy load may include measurements of a utility service quantity, such as an electrical utility service, a gas utility service, a water utility service, compressed air consumption, a steam utility service, and the like. By automatically and regularly modeling the energy consumption pattern of the energy load, aspects of the present disclosure provide systems and techniques for automatically determining that an energy consumption pattern has changed from a baseline energy consumption pattern by a statistically significant amount. Aspects of the present disclosure further provide for alerting an energy consumer to the changes in the energy consumption pattern upon detecting a statistically significant change in the energy consumption pattern.

For example, a computer-implemented method of modeling and monitoring an energy load in accordance with the present disclosure includes using a load monitoring server to define an influencing driver that affects operation of a system's energy load. The influencing driver or drivers are characterized numerically by independent variables that affect system operation. In one system, the influencing driver may be outdoor temperature, for example. The outdoor temperature affects system operation of an HVAC system. Likewise, a computer-implemented method of modeling and monitoring an energy load includes defining a predicted quantity, or modeled variable, whose value is predicted by the model on the load monitoring server. The predicted quantity may be a dependent variable, such as "kilowatts" in the HVAC system example. The monitoring and modeling system may then be used to determine the effect that outdoor temperature has on the number of kilowatts used in the HVAC system.

Once the variables are defined, the computer-implemented method for modeling and monitoring an energy load receives a reference dataset at the load monitoring server. The reference dataset includes coincident values of the dependent variable, and independent variables. In the HVAC system example, the reference dataset includes values of the kilowatt hours consumed and/or a number of gas therms consumed (or instantaneous measurements of the rate of consumption, e.g., kilowatts or gas therms per hour), the outdoor temperature, and/or the occupancy status of the building at a number of times during a reference period, which can span days, weeks, months, or years. The modeling and monitoring system and method then creates a model from the reference dataset with the load monitoring server. The models represent operation of the energy load of the system during the reference period.

An aspect of the present disclosure models a physical system by the use of a linear regression model, which computes a predicted quantity as a linear combination of scaled input quantities. The model receives measured or observable qualities of a physical system and predicts the numerical characterization of some other quality of the system that is causally influenced by the observed qualities, such as energy consumption. As above, the observable qualities of the physical system that can be measured or observed are referred to as "independent variables." The quality of the system that is thought to be causally influenced by the independent variables is called the "dependent variable." The model can be created empirically using a reference dataset including both the dependent and independent variables over some reference time period.

Aspects of the present disclosure further provide for generating more than one model having different forms (e.g., multiple changepoint models, linear models, etc.), and then selecting the model which provides the best fit to the modeled variable (dependent variable).

According to some embodiments of the present disclosure, a monitor (e.g., a meter) is employed to monitor an amount of energy consumption of a building, and a sensor is employed to detect a driver variable that influences the amount of energy consumption. The sensor can be a thermometer, wind speed detector, building occupancy sensor, etc. A communication network transfers data indicative of both the monitored amount of energy consumption and the detected influence on the amount of energy consumption to a server. The server is used to generate a model of the amount of energy consumption as a function of the influence on the amount of energy consumption.

According to some embodiments of the present disclosure, a computer-readable storage media for modeling and monitoring an energy load in accordance with the present disclosure includes one or more computer-readable instructions configured to cause one or more computer processors to execute operations including defining a dependent variable with a load monitoring server, the dependent variable representing the energy consumption of a load and defining an independent variable with the load monitoring server, the independent variable representing an influencing driver of the operation of the energy load. The computer-readable storage media also includes instructions configured to cause a processor to execute operations including receiving an input dataset at the load monitoring server, the input dataset including additional coincident values of the independent variable or variables and processing the additional coincident values of the independent variable or variables the with the created models. The computer-readable storage media also includes instructions configured to cause a processor to execute operations including generating an output dataset with the load monitoring server from the created models, the output dataset including predicted dependent variable values coincident with values from the independent variable or variables from the input dataset.

The foregoing and additional aspects and embodiments of the present invention will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the invention will become apparent upon reading the following detailed description and upon reference to the drawings.

DETAILED DESCRIPTION

Although the invention will be described in connection with certain aspects and/or embodiments, it will be understood that the invention is not limited to those particular aspects and/or embodiments. On the contrary, the invention is intended to cover all alternatives, modifications, and equivalent arrangements as may be included within the spirit and scope of the invention as defined by the appended claims.

Unless otherwise noted, or as may be evident from the context of their usage, any terms, abbreviations, acronyms or scientific symbols and notations used herein are to be given their ordinary meaning in the technical discipline to which the disclosure most nearly pertains: monitoring and modeling energy consumption patterns of an energy loads in an energy consuming structure. The following terms, abbreviations and acronyms may also be used in the description contained herein. A "modeled variable" is a physical quantity that can be measured or observed and characterized numerically, which is believed to be causally influenced by one or more driver variables. A "driver variable" includes any physical quantity that can be measured or observed and characterized numerically. Examples of driver variables include, but are not limited to, indoor and outdoor temperature, humidity, barometric pressure, cloud cover, length of day, building occupancy, product colour, product weight, production activity, man-hours worked, and the like. "Driver data" are advantageously a sequence of time-stamped data values representing measurements or observations of one or more driver variables. A "driver data point" is a set of values, one for each driver variable in a model, all of which are measured/observed at the same point in time. Simultaneous values of temperature, pressure, wind speed and building occupancy can form a driver data point for a model which depended on those variables, for example. A "model" is a mathematical formula that produces an estimate of the modeled variable as a function of a driver data point (or multiple driver data points). A "reference dataset" is a set of driver data and data for the modeled, dependent variable for some time period or periods (the reference period) which is considered to exemplify typical behaviour of the system to be modeled. The reference dataset is analyzed to determine the functional form of the model using linear regression, as one technique. A "reference time period" is the time period or periods covered by the reference dataset.

Figure 1:
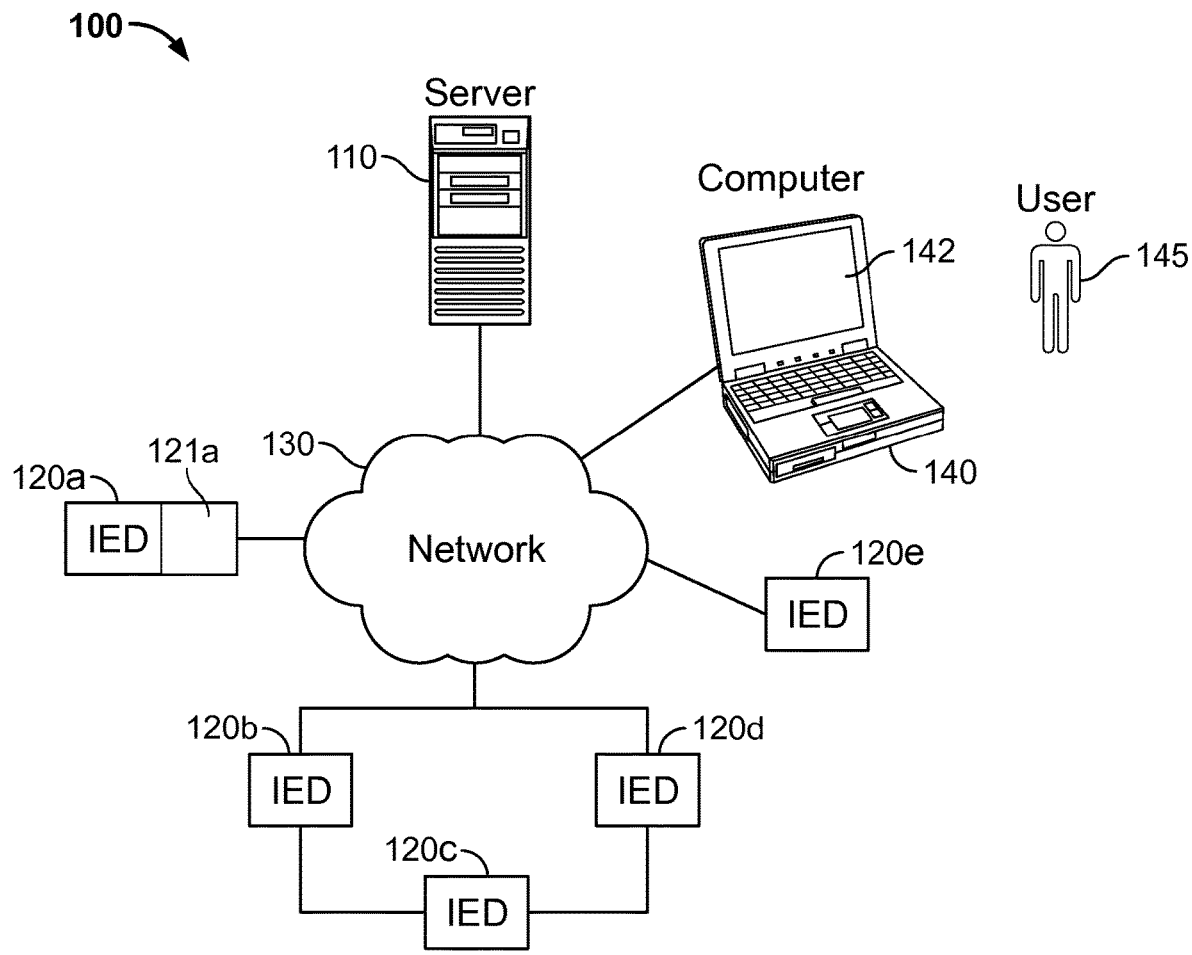
FIG. 1 is a functional block diagram of an energy modeling and monitoring system according to some aspects of the present disclosure.

FIG. 1 illustrates an energy monitoring system 100. The energy monitoring system 100 includes a load monitoring server 110, a plurality of intelligent electronic devices 120a-e (hereafter "IEDs"), a communications network 130, and a computer 140. The IEDs 120a-e are communicatively coupled through the communications network 130 to the load monitoring server 110 and the computer 140. Each of the IEDs 120a-e can include one or more communication interfaces in order to allow data gathered by the IEDs 120a-e and/or stored in internal memory of the IEDs 120a-e to be conveyed to the server 110 via the communications network. For example, the IED 120a is illustrated with a communication interface 121a. The communications network 130 can be a wired or a wireless network. The IEDs 120a-e are system elements or devices with the ability to collect (e.g., measure, monitor, or otherwise observe) one or more operational characteristics or parameters of an energy load. The energy load being monitored by the energy monitoring system 100 can be any of the five utilities designated by the acronym WAGES, or water, air, gas, electricity, or steam, or can be any other physical system, such as a production facility, a production line, an HVAC system, other industrial facilities, and the like. The energy monitoring system 100 can also monitor other energy consuming systems related to the WAGES utilities, the other industrial facilities, and the like. In the electrical utility context, the IEDs may be based on a PowerLogic® ION7550/7650 Power and Energy Meter available from Schneider Electric or any other suitable monitoring device (e.g., circuit monitor), circuit breaker, relay, metering device, or power meter, or the like.

The energy monitoring system 100 can be configured to monitor one or more of a plurality of characteristics or parameters of any of the WAGES utilities or other physical systems. For an electrical utility, the energy monitoring system 100 may be configured to monitor electrical characteristics such as, for example, power, voltage, current, current distortion, voltage distortion, and/or energy. For other utilities, the energy monitoring system 100 can be configured to monitor volumetric flow rates, mass flow rates, volumetric flux, mass flux, and the like. For convenience, the discussion herein refers to amounts of energy consumption of a structure or building, although it is understood that the amounts of energy consumption referred to is generally the amount of energy consumption of one or more energy loads housed within or associated with the structure or building.

For simplicity, the following disclosure will be described in reference to an embodiment of the energy monitoring system 100 configured to monitor power (in kilowatts or kilowatt hours, for example), although it is understood that aspects of the present disclosure can similarly be applied to monitoring any other electrical characteristic, or any other characteristic of any of the WAGES utilities or any other physical system, such as a production facility, a production line, a manufacturing facility, a factory, an HVAC system, other industrial facilities, and the like. Each of the IEDs 120a-e produce monitored characteristic values periodically at a monitoring interval, where the monitored characteristic values are indicative of the physical characteristic being monitored. Put another way, the IEDs 120a-e monitor power to produce a plurality of power measurements indicative of the electrical power being consumed.

For example, WAGES utilities and other physical systems can be modeled mathematically by taking one or more observable qualities of the physical system that can be measured or observed (driver variables), and using these driver variables to predict the numerical characterization of some other quality of the system (modeled variable) which is thought to be causally influenced by the drivers. Linear regression models in accordance with the present disclosure can be created empirically from a reference dataset that includes both the driver and modeled variables over some reference time period, and then inferring the relationship that best estimates the modeled variable from the driver variables in the reference dataset. The reference time period is advantageously selected to span a substantially representative range of possible values of the driver value. For example, the reference period can be one year and can span seasonal temperature variations such that the range of possible driver values (e.g., outside temperatures) that influence the modeled variable (e.g., energy consumption) over the course of the year due to seasonal variations are substantially represented by the reference dataset.

The systems and methods of the present disclosure include mathematically modeling physical systems using linear regression models, which compute a predicted quantity as a linear combination of scaled input quantities. Linear regression models in accordance with the present disclosure also include those models which compute a nonlinear transform of the predicted quantity as a linear combination of one or more scaled input quantities, any of which may also have been previously nonlinearly transformed. Common transformations used on input and modeled quantities include, but are not limited to logarithm, exponential, square, square root, and higher order polynomials. For example, independent variable values may be scaled such that the modeled relationship between the independent and dependent variables is approximately linear. Additionally, the same scaling used to create the model may be applied to independent variable values when using the model to generate predicted dependent variable values.

With reference to the example energy monitoring system 100 shown in FIG. 1, power monitoring system 100 includes a load monitoring server 110 and a group of attached sensors or other data entry means, including IEDs 120a-e. The energy monitoring system 100 can be used to predict the total energy consumption (e.g., electrical energy consumption) of energy loads in a particular industrial building (or other structure) in a day (or other time period). In the example energy monitoring system 100, the modeled variable is total daily electrical energy consumption. To create a model of total daily electrical energy consumption, data are supplied that indicates the actual energy consumption during some time period of observation. Data are also supplied that characterizes the influences on the building's energy consumption during the same time period of observation. Data are provided via sensors, monitors, or other data entry means, such as IEDs 120a-e. The cumulatively provide driver data to be analyzed via the server 110 and/or the computer 140 according to a linear regression technique to determine a suitable model to mathematically characterize the total daily electrical energy consumption of the building as a function of the influences on the building's energy consumption.

Figure 2:
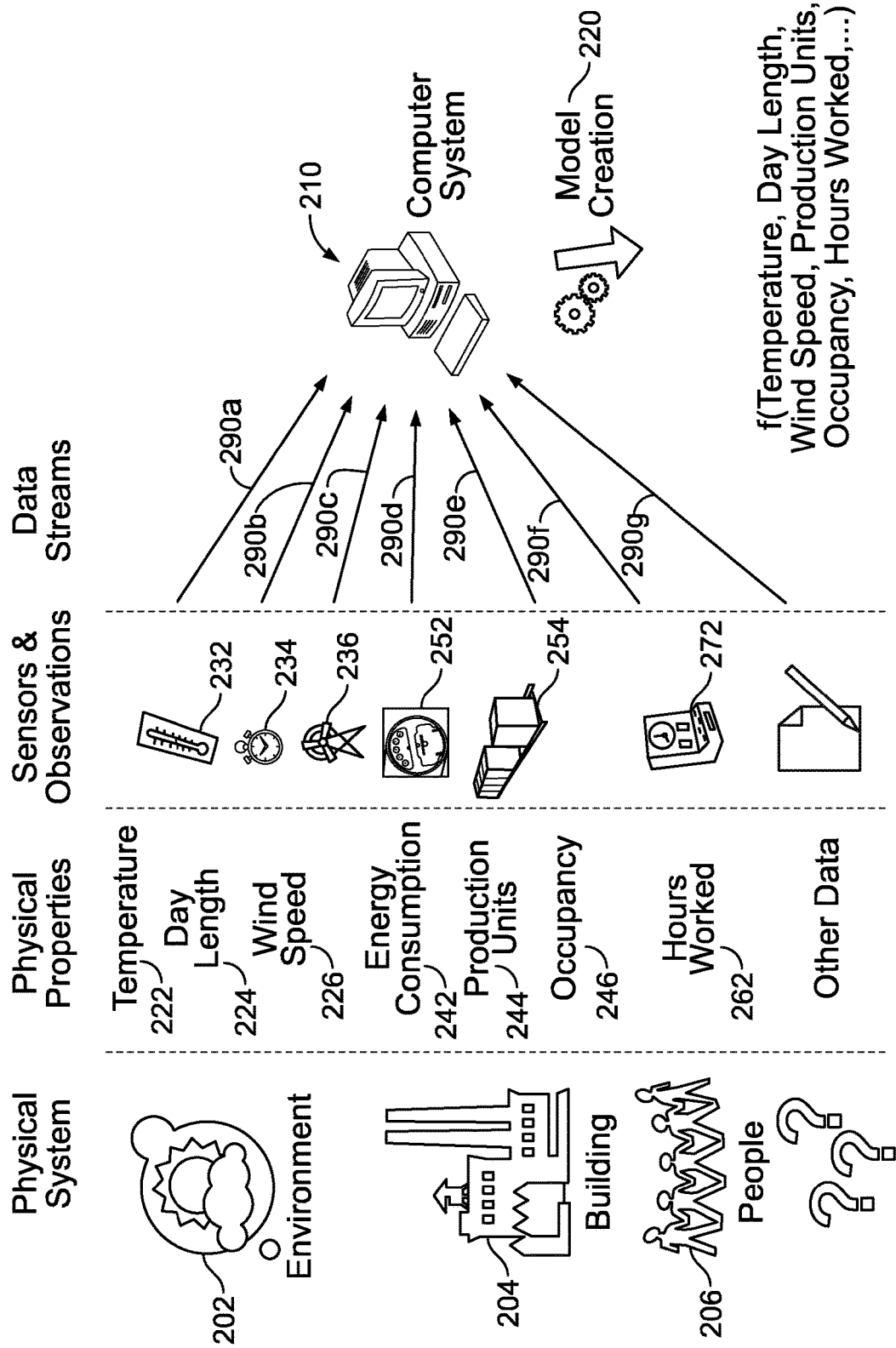
FIG. 2 is a graphical representation of a creation of an energy model in accordance with the present disclosure showing physical systems with observed physical properties as data stream inputs to a monitoring and modeling server.

FIG. 2 expands the example of FIG. 1 to show that any physical system, including environment 202, building 204, and people 206 systems possess physical properties 222, 224, 226, 242, 244, 246, 262 that may be observed and measured using sensors and other observational tools 232, 234, 236, 252, 254, 272. Streams of time-stamped data 290a-g indicate the outdoor weather temperature 222, length of day 224, wind speed 226, amount of energy consumption of the building 242, building occupancy 246, hours worked 262 by people inside the building, and a measure of business activity (such as the production units 244 of widgets manufactured, for example). The sensors and observational tools can include thermometers 232 outside the building, clocks 234 monitoring day length, wind speed gauges 236, electrical meters 252, time clocks 272, and monitors 254 of the business activity of the building. In some embodiments the sensors and observational tools can optionally include humans observing information indicative of energy consumption, such as building occupancy, production output, etc. Such human-observed information ("manually-observed information") can be input to the computer system server 210 via a data entry process that can optionally be at least partially automated (such as, for example, by incorporating optical character recognition). The computer system server 210 analyzes the time-stamped data 290a-g (reference data) for a reference time period to determine an optimal formula to model the relationship between the driver variables 222, 224, 226, 244, 246, 262 and the modeled variable (daily energy consumption 242, for example). Once a model 220 is created, a prediction for energy consumption on any day can be made by supplying values for the driver variables for that day. That is the model 220 provides a mathematical characterization of energy consumption 242 as a function of the driver variables 222, 224, 226, 244, 246, 262.

Figure 3:
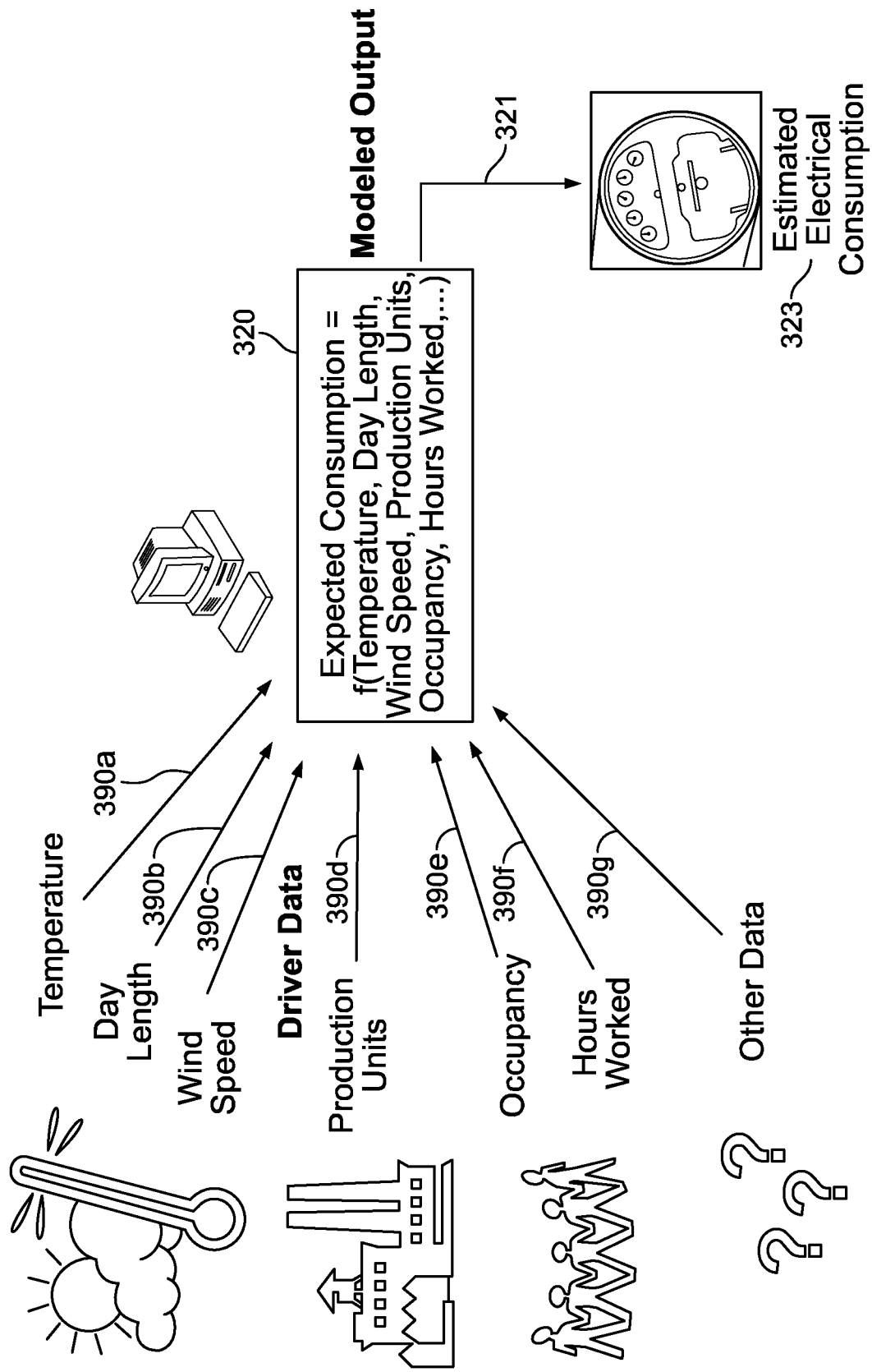
FIG. 3 is a graphical representation of a model in accordance with the present disclosure used to predict estimated electrical consumption based upon a variety of driver data.

In FIG. 3, the model 320 is analyzed by supplying driver variable data 390a-g for other time periods (i.e., time periods other than the reference time period) to generate a modeled output 321 that is an estimate 323 of what the modeled variable (electrical consumption) is predicted to be if the system 100 performs as it did during the reference time period.

The reference time period may be any period or duration of time where the independent variables and the dependent variables are sampled. The monitoring interval may be any period or duration of time between producing the monitored characteristic values. For example, the monitoring interval can be one minute, one second, one tenth of a second, etc. For a monitoring interval of one second, the IEDs 120a-e in FIG. 1 produce a monitored characteristic value (e.g., derived from a power measurement) every second. An IED monitoring power every second may produce a periodic sequence of monitored characteristic values as follows: [99.7 kW, 99.8 kW, 100.2 kW, 100.1 kW, 125.0 kW]. Each of these power measurements corresponds to a monitored characteristic value produced periodically at consecutive one second intervals.

According to some embodiments of the present disclosure, the monitored power values (characteristic values) and/or any associated information stored in the memory of the first IED 120a are transmitted over the network 130 to the load monitoring server 110 for storage and/or processing. According to some embodiments, the monitored characteristic values and/or associated information stored in the memory of the IEDs 120a-e are transmitted over the network 130 at predetermined intervals. For example, the monitored characteristic values and associated information can be transmitted every hour, every twelve hours, every day, every week, or every month. Other transmission schedules with more or less frequency are contemplated depending on the amount of memory in the IEDs 120a-e and the duration of the first logging interval.

A user 145 of the computer 140 (such as a workstation) can view the monitored power values on a display 142. The user 145 can also view any associated information stored on the server 110. Optionally, the user 145 can connect a workstation computer 140 through the network 130 directly to one or more of the IEDs 120a-e to view and/or download the monitored characteristic values and/or associated information stored on the IEDs 120a-e on the display 142.

Figure 4:
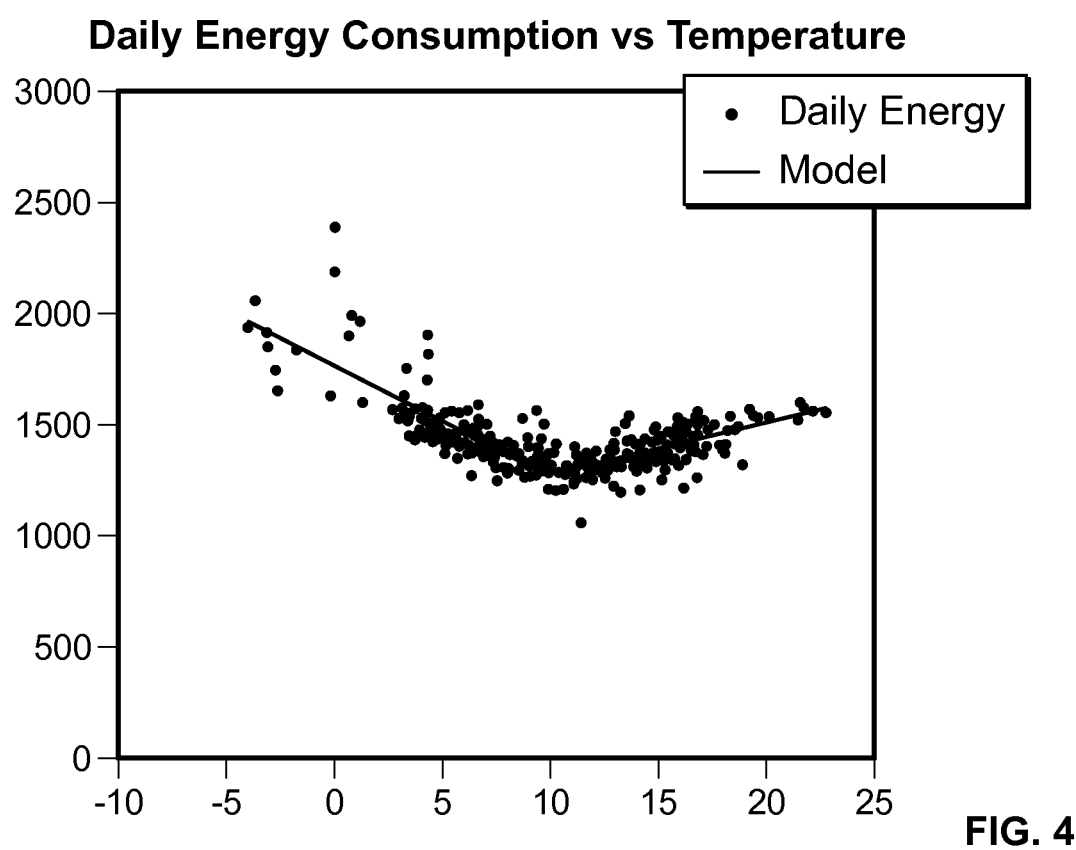
FIG. 4 illustrates an example of a single driver model showing a nonlinear relationship approximated by a piecewise linear model.

While conventional linear regression models may be acceptable for systems that respond in a linear way to their surroundings, for systems that exhibit nonlinearity in the relationships between the driver data and the modeled variable, piecewise linear models provide a simplified approach to approximating nonlinear models. FIG. 4 illustrates an example of a single driver model for energy consumption in a building as a function of average daily outdoor temperature showing a nonlinear relationship being approximated by a piecewise linear model. A piecewise linear model can be characterized as a change point model expressed as Equation 1:

$$y(X_1,X_2,X_3)=\beta_1+\beta_2(X_1-\beta_4)^-+\beta_3(X_1-\beta_5)^++\beta_6 X_2+\beta_7 X_3+ \quad \text{(Eq. 1)}$$

In the change point model of Equation 1, the influence of the primary driver, $X_1$, is given by: $\beta_2(X_1-\beta_4)^-+\beta_3(X_1-\beta_5)^+$; the influence of the secondary driver, $X_2$, is given by: $\beta_6 X_2$; and the influence of the tertiary driver, $X_3$, is given by: $\beta_7 X_3$. The "+" and "−" in superscripts indicate that the values of the parenthetic terms shall be set to zero when the terms are negative and positive, respectively. That is, the term enclosed by ( )$^+$ shall be non-zero when $X_1>\beta_5$, and the term enclosed by ( )$^-$ shall be non-zero when $X_1<\beta_4$. The variables $\beta_i$ can be considered the parametric variables characterizing the change point model $y(X_1,X_2,X_3,\ldots)$ shown in Equation 1. In particular, $\beta_1$ is the y-intercept; $\beta_2$ is the left slope for the primary driver; $\beta_3$ is the right slope for the primary driver; $\beta_4$ is the left change point value; $\beta_5$ is the right change point value; $\beta_6$ is the slope of the secondary driver variable; and $\beta_7$ is the slope of the tertiary driver variable. In an example where the left and right change point values ($\beta_4$ and $\beta_5$) are relatively far apart, the resulting change point model can have a central region with a slope of zero with respect to the primary driver variable.

The change point model of Equation 1 is generally of the form described, for example, in ASHRAE standard 14-2002 for modeling energy consumption as a function of driver variables. The change point model offers advantages in that non-linear relationships can be handled according to piecewise linear functions to simplify data processing and provide a model that can be applied to at least approximately model generic non-linear relationships. In addition, while the change point model of Equation 1 is provided as an example of a piecewise linear function, other piecewise linear functional forms are explicitly contemplated by the present disclosure, including models with multiple change points.

As shown in FIG. 4, the daily energy consumption of the modeled building is shown to have a decreasing relationship with respect to increasing temperature until a "change point" of approximately 10° Celsius (approximately 50° F.). As temperatures increase above the change point, the daily energy consumption is shown to have an increasing relationship with respect to temperature. The change point relationship can be due to, for example, energy consumption required to heat (cool) the building increasing as the outside temperature decreases below (increases above) the change point temperature of approximately 10° C. As shown in FIG.

4, the daily energy consumption with respect to temperature is approximately linear on either side of the change point temperature.

Figure 5:
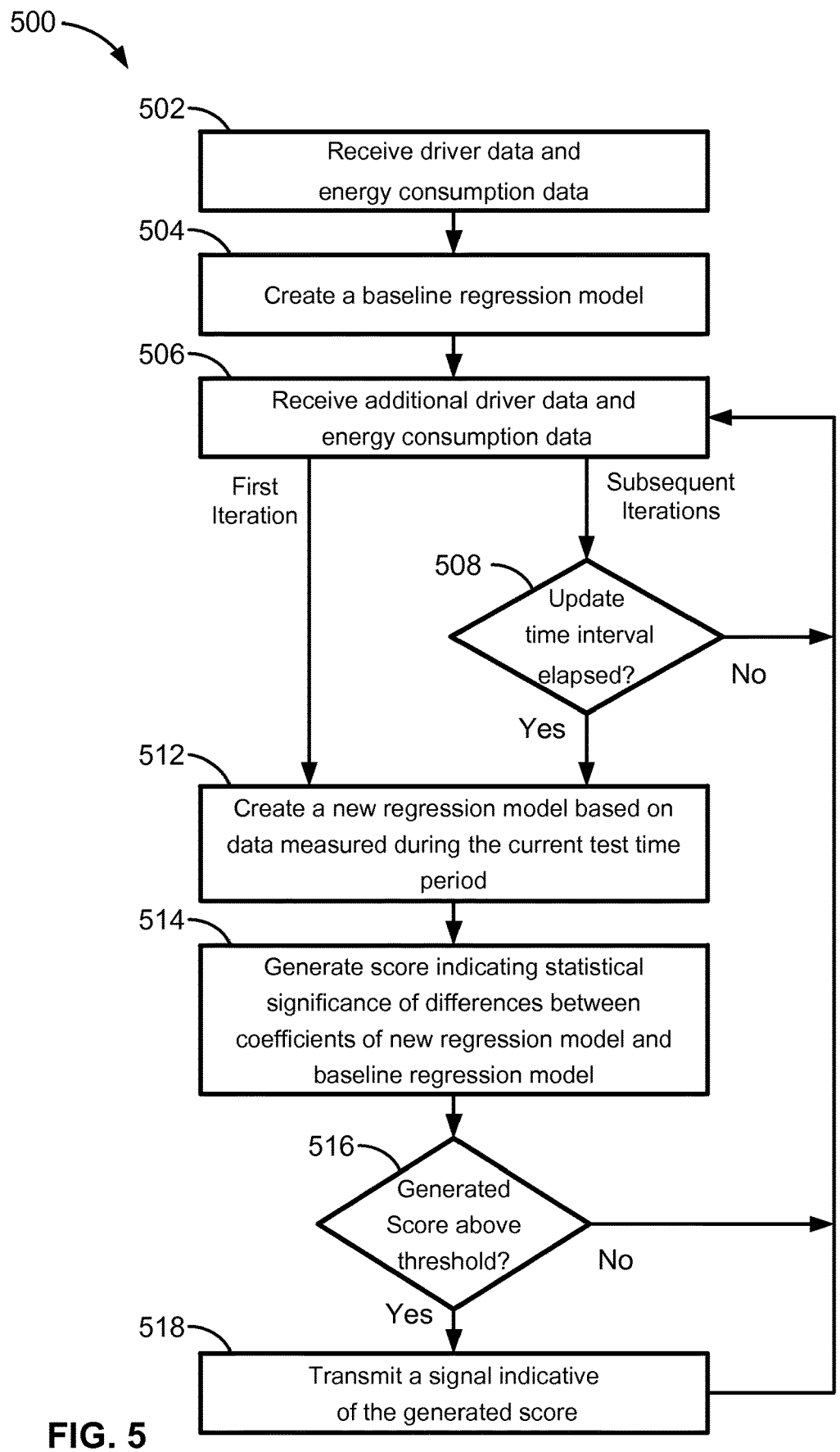
FIG. 5 provides a flowchart illustrating a method for detecting statistically significant changes in an energy consumption pattern of energy loads housed by a structure.

FIG. 5 provides a flowchart 500 illustrating a method for detecting statistically significant changes in an energy consumption pattern of energy loads housed by a structure. The flowchart 500 will be described in part with reference to the energy monitoring system 100 of FIG. 1. To create a model, the server ("controller") 110 receives driver data indicative of driver variables and energy consumption data during a baseline time period (502). The baseline time period is similar to the reference time period discussed above in connection with FIGS. 1 and 2 and is similar to the baseline time period 820 discussed in connection with FIGS. 8A and 8B. The baseline time period can be one year, or can be shorter or longer than one year. The baseline time period advantageously spans a substantially representative range of possible values of the driver variables. For example, when developing a baseline model of energy consumption of a building in a region with significant seasonal temperature variation, the baseline time period is desirably selected to span a substantially representative range of typical temperature variations experienced over the course of a year. In another example, when developing a baseline model of energy consumption of a building located in a temperate climate, in an Equatorial region, etc., the baseline time period can be selected to span a shorter period, such as one month.

The driver data and can be a set of data that is measured by one or more sensors (e.g., thermometer, building occupancy sensor, etc.) such as the IEDs 120a-e and communicated to the server 110 via the communication network 130. The energy consumption data can be a set of data that is measured by one or more monitors (e.g., electrical power meter) such as the IEDs 120a-e and communicated to the server 110 via the communication network 130. In some embodiments, the energy consumption data can also include data from human-observed quantities, such as, for example, building occupancy, production output, etc. Such human-observed quantities can be entered into one or more computer systems and communicated to the server 110 via the communication network 130. The driver data and the energy consumption data advantageously each include data representing a series of measurements sampled at a regular interval such that the series of measurements include substantially coincident measurements of the driver variables and the amount of energy consumption. Additionally or alternatively, the respective series of measurements can include time-stamped indicators in order to map individual measurements of the amount of energy consumption with substantially coincident measurements of the driver variables (i.e., influences on the amount of energy consumption).

Once the server 110 receives the sets of data (i.e., driver data and energy consumption data) during the baseline time period (502), a baseline regression model is generated (504). The baseline regression model can be generated according to linear regression techniques to analyze the measurements in the sets of data to determine a best fit parametric model characterized by a plurality of parametric variables. The linear regression analysis can be undertaken by, for example, minimizing a $\chi^2$ or $R^2$ value to provide one or more equations to be solved simultaneously. The linear regression analysis can be carried out by determining parametric variables that provide the best fit to the sets of data while minimizing the sum of the squared differences from the model's prediction and the measurements of the amount of energy consumption. The parametric model can be, for example, a linear model or a linear piecewise model such as the change point model described above with reference to FIGS. 2-4 and Equation 1.

Additional driver data and energy consumption data are received at the server 110 (506). It is recognized that the flowchart 500 illustrates an ongoing, partially repetitive process, however during an initial iteration of the process, data are received (506) until sufficient data are available to construct the first test model. During subsequent iterations of the process, additional data are received (506) until an additional update time interval has elapsed (508). Generally, the additional driver data and energy consumption data are sets of data indicating the amount of energy consumption and influences on the amount of energy consumption measured during a period following the baseline time period. The test time period can optionally be the same length as the baseline time period, or can be shorter or longer than the baseline time period. In an example, the baseline time period has a duration of one year while the test time period has a duration of one month. The data received during the test time period are used to create a new parametric model through a regression analysis (512). New models are created automatically with a regular interval referred to as an update time interval (e.g., the update time interval 840 of FIGS. 8A and 8B). The update time interval can be a length of time shorter than the test time period, and can be as short as one week, one day, or one hour. The update time interval indicates the length of time between successive generations of new models, and is chosen in part based on a desired refresh rate of successively generated scores to indicate whether an energy consumption pattern has changed.

In an implementation, the test time period can be updated between successive iterations of the general process shown in the flowchart 500. Shifting the test time period can be accomplished by updating both the start and end points of the test time period to be moved by an amount of time given by the update time interval. Shifting the test time period by the update time interval can be carried out to enable subsequent model generation to be performed based on data measured during the "current" test time interval (i.e., the test time interval shifted with respect to the preceding one by the update time interval). Updating the test time intervals is also described below with reference to FIG. 8A.

As discussed above, the new regression model is created from the data sets measured during the test time period (512). The generation of the new regression model (512) is generally carried out in a manner that constrains its functional form to be the same as the baseline model (504) to find a best fit parametric model to mathematically characterize the amount of energy consumption during the test time period as a function of the driver variables.

The new regression model generated from the data sets measured during the test time period (512) is compared to the baseline regression model generated from the data sets measured during the baseline time period (504). The comparison is characterized by a score indicating the statistical significance of differences between the new regression model ("updated regression model") and the baseline regression model (514). The score can be computed according to the mathematical process described below with reference to Equations 2-4. Generally, the score is computed by comparing the individual parametric variables ("model coefficients") of the new regression model with those of the baseline regression model, and characterizing the statistical significance of the differences in the respective parametric variables of the two models. Characterizing the statistical significance can be carried out by evaluating the probability that the differences in the respective parametric variables are explained by expected random variations or uncertainty. The probabilities associated with each parametric variable can then be multiplied together to form a cumulative probability reflecting a single score that characterizes the statistical significance of the cumulative differences. For the exemplary score computation described with reference to Equations 2-4 below, the parametric variables of the models can be the set of $\beta_i$ coefficients characterizing the change point model described in connection with FIG. 4 and Equation 1. Of course, aspects of the present disclosure are specifically contemplated to apply to models other than a change point model.

Equation 2 can be used to compute a "z-score" corresponding to the hypothesis that the $i^{th}$ parametric variable, $\beta_i$, has not changed between the baseline parametric model and the new parametric model. Equation 2, below, defines the z-score, $z_i$:

$$z_i = \frac{\beta_i^{new} - \beta_i}{\sqrt{(\Delta\beta_i^{new})^2 + (\Delta\beta_i)^2}} \qquad (\text{Eq. 2})$$

The z-score thus normalizes the difference observed between the $\beta_i^{new}$ and $\beta_i$ parametric variables, corresponding to the new and baseline parametric models, respectively. The difference is normalized by the quadrature sum of the respective uncertainty values of the two parametric variables. The respective uncertainty values of the parametric variables are represented by $\Delta\beta_i^{new}$ and $\Delta\beta_i$. The respective uncertainty values (e.g., $\Delta\beta_i^{new}$ and $\Delta\beta_i$) are new generated simultaneously with the sets of parametric variables (e.g., $\beta_i^{new}$ and $\beta_i$) during the regression analyses (504, 512). The z-score is a measure of the difference between respective parametric variables in the two models that is normalized by the expected uncertainty in the difference according to a propagation of error analysis. For example, where the distribution of expected differences is assumed to be a standard normal distribution, the denominator in the right hand side of Equation 2 is the standard deviation of values of the differences, based on the associated uncertainty values of the parametric variables, and the z-score is therefore a measure of the difference in units of standard deviations away from zero (i.e., the number of standard deviations away from the normal distribution). The z-score can then be evaluated to determine an associated p-value according to a standard normal distribution, which is represented by the function Prob($z_i$) in Equation 3 below:

$$p(Y = Y^{new}) = \prod_{i=1}^{N}(Prob(z_i)) \qquad (\text{Eq. 3})$$

The probability that the new model, $Y^{new}$, is equal to the baseline model, Y, is thus the product of all the p-values (i.e., Prob($z_i$)) associated with the differences between the respective parametric variables of the new parametric model and the baseline parametric model. The p-values referred to herein generally refer to the probability of a value deviating from the expected value (i.e., zero) in units of standard deviation, according to a normal ("Gaussian") distribution. A score ("difference score") is generated to characterize the overall likelihood that the baseline regression model and new regression model are characterizing the same energy consumption pattern. As shown in Equation 4, the value provided as the generated score can be the inverse of the probability determined in Equation 3. Equation 4 is given below:

$$\text{score} = \frac{1}{p(Y = Y^{new})} \qquad (\text{Eq. 4})$$

Thus, Equations 2-4 provide one scheme for generating the score from the parametric variables ("coefficients") and associated uncertainty values of the baseline and new regression models (514). A high value of score indicates a relatively large probability that the baseline model and the new regression model characterize a different energy consumption pattern. It is particularly noted that aspects of the present disclosure advantageously allow a system for detecting changes in energy consumption patterns to be sensitive to changes in energy consumption that may be systematically different while still providing changes in overall energy consumption that are undetectable. For example, in an implementation of the present disclosure where energy consumption is modeled according to two driver variables, it is possible that a change in an energy consumption pattern can occur which causes energy consumption to become less influenced by the first driver variable (e.g., relatively less energy consumed due to increasing temperature) while simultaneously becoming more influenced by the second driver variable (e.g., relatively more energy consumed due to increased building occupancy). In such an example, the changes in energy consumption due to the two driver variables can be offsetting. As a result, the model may continue to provide accurate predictions of total energy consumption such that the underlying change in energy consumption pattern is obscured and may go undetected.

As shown in FIG. 5, the value of score is compared with a threshold value (516) to determine whether the value of score indicates a statistically significant change in energy consumption pattern that requires further study or investigation. The threshold value can be selected based on the duration of the update time interval (e.g., 840 in FIGS. 8A and 8B), an acceptable rate of false alarm events, and a desirable sensitivity to changes in the energy consumption pattern. If the generated score is above the threshold value, a signal indicative of the generated score is transmitted (518). The signal can be transmitted form the server 110 via the network 130 to a work station computer 140. The signal can be, for example, an indication that the score is above a threshold, and can also include information indicating the relative influence on the generated score due to differences in each parametric variable (e.g., the p-values associated with the difference of each respective parametric variable). Alternatively, the signal can be transmitted routinely and without regard to a comparison between the generated score and a threshold value.

Whether the score is above the threshold or not, additional driver data and energy consumption continues to be received (506) until another update time interval has elapsed (508) and another new regression model is created (512). Thus, the method described by the flowchart 500 can be implemented in an ongoing fashion by continuously (or periodically) receiving additional driver data and energy consumption data (506), and generating new regression models on the update time interval (512). A score is generated for each new regression model on the update time interval to indicate the cumulative probability that the new regression model characterizes an energy consumption pattern that has changed relative to the baseline energy consumption pattern (514).

In an example, the display 142 of the computer 140 of FIG. 1 can be used to display information related to the differences between the baseline and new regression models, such as the generated values of score, the p-values, etc. For example, the display 142 of the computer 140 can be configured to display information related to the transmitted signal (518) so as to enable the user 145 to view the displayed information.

In an example, the baseline regression model can be generated (504) by selecting from a range of possible model forms that best fit the driver data provided, but the new regression model is generated (512) specifically according to the model form selected as the best fit for the baseline regression model. For example, in an implementation where the baseline regression model is determined to be best fit to a change point model having six parametric variables, the new regression model is generated by finding another change point model with six parametric variables to characterize the energy consumption during the test time period. In another example where the baseline regression model is found to be a best fit with a simple linear model having two parametric variables (e.g., y-intercept $\beta_1$ and slope $\beta_2$), the new regression model is generated according to the same model form (i.e., a simple linear model having two parametric variables). Generating the new regression model to have the same form as the baseline regression model ensures that the two models each have the same number of parametric variables ("coefficients"). Furthermore, ensuring that the two models each have the same form allows meaningful comparisons between the successively generated parametric variables to be performed as described herein so as to generate a score indicating the statistical significance of the differences between the successively generated models.

Aspects of the present disclosure further provide for detecting, with greater precision than previously available, the nature (i.e., root cause) of changes in an energy consumption pattern. In particular, because each parametric variable is evaluated with a separate p-value, it is possible to identify the particular parametric variables that contribute most significantly to a particular generated score (e.g., by identifying the parametric variables with the lowest corresponding p-values). By identifying the particular parametric variables that have changed relative to the baseline regression model in the most statistically significant manner, an energy consumer is given clues as to the potential source (i.e., the root cause) of the observed change in energy consumption. For example, an energy consumer can discriminate between a change in their energy consumption pattern that is due principally to changes in the modeled building's temperature sensitivity, which may be due to a change in insulation, a broken or open window, etc. By the same token, an energy consumer can ascertain whether changes in their modeled building's energy consumption pattern is due principally to changes in the building's sensitivity to occupancy, which may be due to employees using excessive lighting, personal computers, etc.

Figure 6:
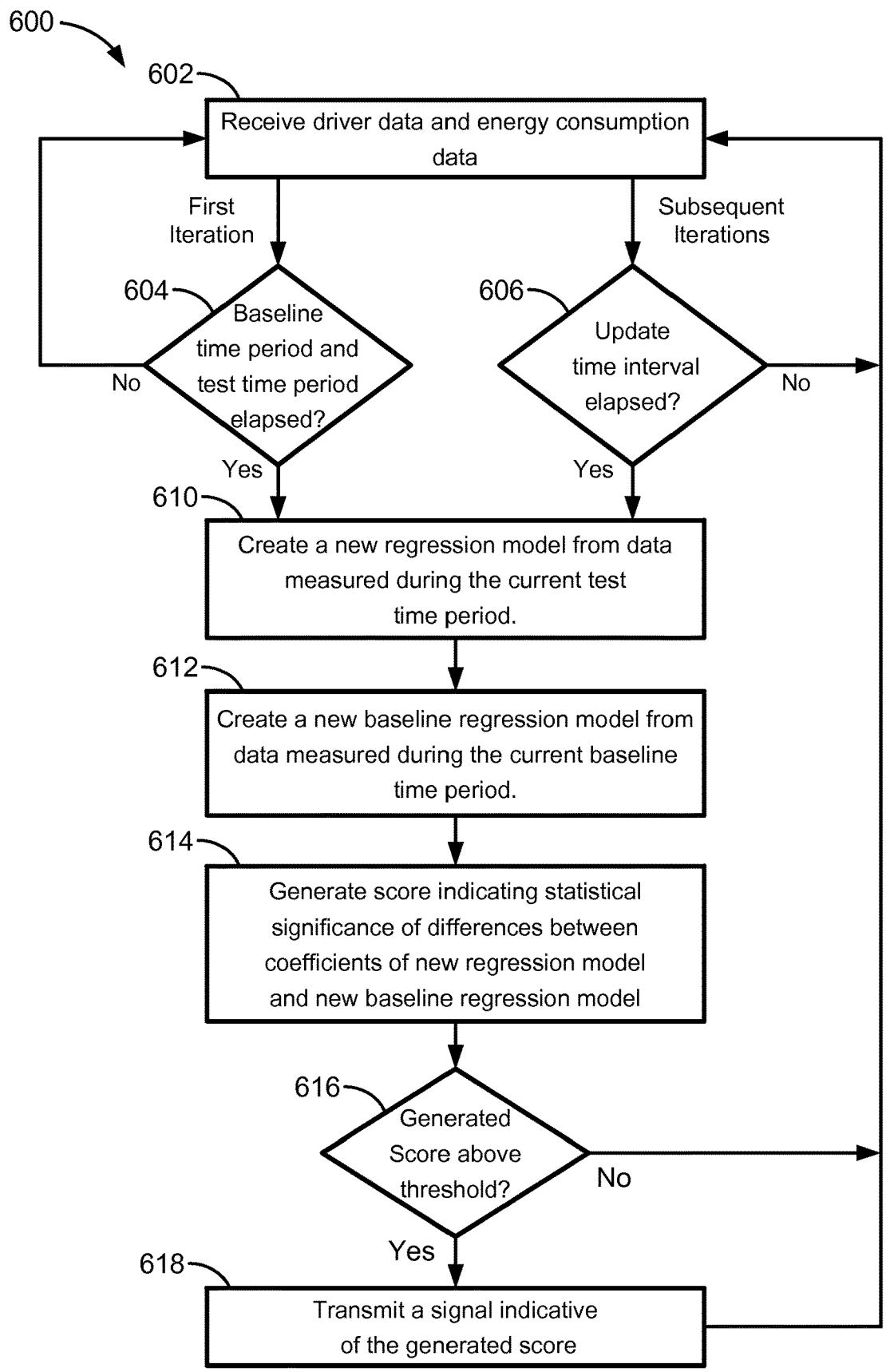
FIG. 6 provides a flowchart illustrating another method for detecting statistically significant changes in an energy consumption pattern of energy loads in a structure.

FIG. 6 provides a flowchart 600 illustrating another method for detecting statistically significant changes in an energy consumption pattern of energy loads in a structure. Driver data and energy consumption data are received (602) to provide data sets to generate parametric models of a building's energy consumption pattern. The flowchart 600 illustrates an ongoing process for routinely monitoring an energy consumption pattern of a building. During an initial portion ("a first iteration") of the method illustrated by the flowchart 600, data are measured/collected and received (602) for a duration including a baseline time period and a test time period (604). The flowchart 600 illustrates an ongoing process, and like the process shown in flowchart 500 of FIG. 5, the "current" test time period is updated between each iteration of the flowchart 500 by shifting the test time period by the update time interval. In addition, in the process illustrated by the flowchart 600, the baseline time period is shifted by the update time interval between each iteration. The timing diagram in FIG. 8B schematically illustrates an initial baseline time period 820 followed by an initial test time period 830. FIG. 8B also illustrates a second baseline time period 822 followed by a second test time period 832. The respective baseline time periods 820, 822 and test time periods 820, 832, 834 are each shifted relative to one another by the update time interval 840. The update time interval can be, for example, one day, and is generally a length of time less than the test time period 830.

A new regression model is created from data measured during the current test time period (610) and a new baseline regression model is created from data measured during the current baseline time period (612). It is specifically noted that the two regression models can be created in parallel (as schematically illustrated in the flowchart 600). The respective models are generated by a regression analysis similar to the description of model generation above with reference to FIG. 5. The generated models advantageously have the same form such that their respective parametric variables are comparable to one another. The generated models are each characterized by a plurality of parametric variables (e.g., $\beta_i$) and by uncertainty values associated with the parametric variables (e.g., $\Delta\beta_i$).

A score indicating the statistical significance of the differences between respective coefficients of the new regression model and the new baseline model is generated (614). The score can be generated similar to the description provided in connection with FIG. 5 and Equations 2-4 above. The score is compared with a threshold value (616), and a signal is transmitted indicating the generated score if the value of score is above the threshold value (618). The process continues with receiving additional driver data and energy consumption data (602). Once data are measured to cover the updated test time period and baseline time period (i.e., shifted by the update time interval with respect to the previous ones), another pair of new models are created (610, 612) and another value of score is generated (614).

According to aspects of the present disclosure, both the methods illustrated in FIGS. 5 and 6 provide for generating automatically and on an ongoing basis a score indicating the likelihood that a building's energy consumption pattern has changed. New values of score can be generated on a regular interval, such as the update time interval. In addition, a new model of energy consumption is according to the same update time interval, and the new model is generated from data sets that are measured during a period that is different from the previously generated models. Each successive test time period can be shifted relative to its previous one by the update time interval. The timing of data measurement and update intervals are further explained with reference to the schematic timing diagrams of FIGS. 8A and 8B.

Figure 7:
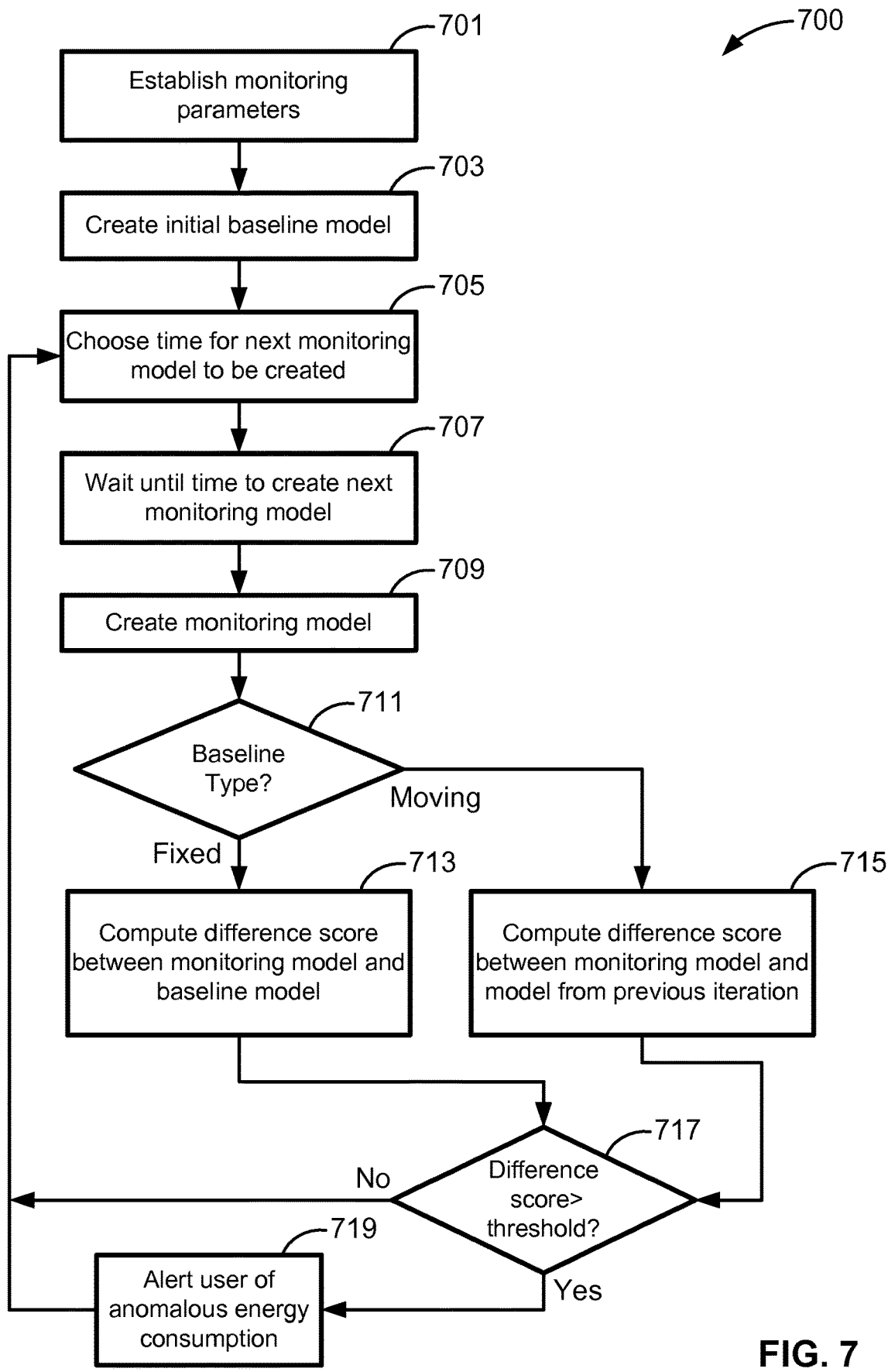
FIG. 7 is a flowchart for a method or algorithm that corresponds to instructions that can be stored on a non-transitory computer-readable medium and executed by one or more controllers in accord with at least some aspects of the present disclosure.

The flowchart of FIG. 7 diagrammatically illustrates an additional method of modeling and monitoring an energy load in a physical system, designated generally as 700, in accordance with aspects of the present disclosure. In some specific embodiments, the flow chart of FIG. 7 can be considered representative of an algorithm for modeling and monitoring an energy load. FIG. 7 can additionally (or alternatively) represent an algorithm that corresponds to at least some instructions that can be stored, for example, in a memory device, and executed, for example, by a controller or processor, to perform any or all of the above or below described steps associated with the disclosed concepts. The method 700 can be considered a unified algorithm which incorporates common features discussed above in connection with FIGS. 5 and 6. For example, as will be discussed further below, the method 700 includes a decision block 711 to determine whether the method 700 is carried out according to a moving baseline (similar to the flowchart 600 of FIG. 6) or according to a fixed baseline (similar to the flowchart 500 of FIG. 5).

As indicated at block 701, the method 700 includes establishing one or more monitoring parameters. In some embodiments, the monitoring parameters are configured by a user, starting from system supplied default monitoring parameters that are preprogrammed into the software. Alternative implementations are certainly envisioned, including scenarios where one or more of the monitoring parameters are independently established by the system or the user. Other inputs, including ancillary parameters and variables, can be made during building of the baseline model, which can be based on common industry knowledge on energy modeling. The monitoring parameters established at block 701 may include, singly and in any combination, determining a difference score sensitivity threshold, determining a monitoring model creation frequency, and selecting a fixed baseline model (e.g., FIG. 5) versus a moving-window baseline model (e.g., FIG. 6), for example. Additional and alternative monitoring parameters can be established as part of block 701 without departing from the intended scope and spirit of the present disclosure.

As indicated above, the monitoring model creation frequency is the rate at which the evaluation models are created and evaluated after the start of the second reference period. This may include establishing the time frequency at which a new monitoring model is constructed and compared to the baseline model, e.g., once every x days/month starting at the beginning of the monitoring period. The difference score sensitivity threshold, as described above and developed further hereinbelow, is a number (greater than zero) against which the difference score between models is compared. For instance, the sensitivity threshold is the number that the computed difference score is compared to, and if the computed difference score between two models exceeds the threshold, then the monitoring model is categorized as significantly different from the baseline, and an energy anomaly can be declared.

Selecting whether to use a fixed baseline model or a moving-window baseline model typically depends, at least in part, on the long-term stability of the electrical system. A fixed baseline model, in general, detects absolute deviation from a known historical period, and would therefore typically be used with well understood, slowly changing systems that are expected to have consistent behavior over long periods of time. A moving window baseline model, in contrast, is typically useful for systems with less long-term stability where some drift over time is tolerable, but a user still wants to check for more sudden changes.

At block 703, an initial baseline model of energy load is created. The baseline model, as explained above, is created over a first reference period and is based, at least in part, on the monitoring parameter(s) established at block 701. The baseline model characterizes the consumption of energy, for example, in a manufacturing process or part of a manufacturing process, in a system or portion of a system, by a building or area of a building, etc., based on one or more driver variables like weather, occupancy, production activity, etc. As indicated above, the baseline model can be created using a linear regression method, which may be in the nature of a piece-wise multi-parameter linear regression method. A change-point model is typically used; however, the type of model often depends, for example, on the system characteristic being modeled. When modeling building energy consumption as a function of outdoor temperature, for example, the relationship observed is typically nonlinear in a way that's captured well by a change-point model. Determining whether to use a 2-parameter, 3-parameter, 4-parameter, etc. model is usually selected by a model-building tool according to well-known industry practice. Typically, the model-building tool will create a model of each type and pick the one that provides the best fit for a particular dataset.

In some embodiments, block 703 also includes defining, e.g., via the load monitoring server 110 of FIG. 1, the dependent variable that is representative of the operation of an energy load, and the one or more independent variables which are representative of one or more influencing drivers of the operation of an energy load. The operation of the energy load may be a dependent variable, such as "kilowatts" in an HVAC system. The influencing drivers are akin to independent variables that affect system operation of the HVAC system, in the example above. In one example, the influencing driver may be outdoor temperature or any other logically relevant driver variables, such as those identified above or below. The outdoor temperature affects system operation of the HVAC system in the building example. The monitoring and modeling system may then be used to determine the specific effect that outdoor temperature has on the number of kilowatts used in the HVAC system. The modeling and monitoring method can also define one or more partition variables that represent operating conditions of the energy load as discrete values. Continuing with the HVAC system example, the partition variable may be defined as comprising discrete values such as "Occupied" and "Unoccupied."

Once the variables are defined, the method may further include receiving a reference dataset, for example, at the load monitoring server 110 of FIG. 1. In some implementations, the reference dataset includes coincident values of the operation of the energy load (dependent variable), the influencing driver (independent variable), and the partition variable. In the HVAC system example, the reference dataset includes values of the kilowatts used, the outdoor temperature, and the occupancy status of the building at a number of times during a day.

As indicated by block 705, the method 700 of FIG. 7 includes choosing the time for the next monitoring model to be created. Monitoring models are created at the monitoring model creation frequency established, for example, at block 701, starting after implementation of the ECM. When the time comes to create a monitoring model, the reference period for that model is generally the same length of time as the baseline-model reference period; however, the monitoring model reference period ends at the current time. Correspondingly, block 705 may also include determining the evaluation model ("second") reference period. This determination is generally dependent upon the type of system being modeled. In a non-limiting example, a large building may take hours to respond to changes in outdoor temperature for physical reasons. As such, trying to model the relationship between temperature and energy consumption on a minute-by-minute basis may not work very well. The may be to aggregate the data to a longer timescale—e.g., hourly, daily, weekly sums of energy correlated to hourly, daily, weekly averages of temperature. Since the frequency at which driver and energy data is available typically cannot be controlled, it may be desirable to aggregate them to longer periods to ensure they line up. For instance, 15-minute energy readings and hourly temperatures, for example, would often get combined to hourly or daily values. The driver variables and driven variable are typically on the same time period to be correlated, for statistical reasons. Block 707 of FIG. 7 indicates incorporating an optional delay between episodes of making and evaluating monitoring models until the time comes to create the next monitoring model. This step can be introduced as an instruction into the software to wait and do nothing until the next time period to make the next model.

An evaluation model of energy load during the second reference period is then created, as indicated at block 709. The evaluation model is based on the monitoring parameter(s) established at block 701 and, as noted above, is typically created using a linear regression method, which may be in the nature of a piece-wise multi-parameter linear regression method. In some embodiments, the evaluation model includes the same driver variables as the baseline model, and an additional driver variable that is representative of the ECM. For instance, an evaluation model is automatically created at regular intervals with the same parameters as the baseline model, but with a different reference period. This may require imposing a constraint on new model creation that it must have the same functional form as the baseline model to which it will be compared. Each time the monitoring model is recalculated, the corresponding reference period is moved so that it is always a fixed length, but is moved ahead in time by the same period each time the calculation is run (if it's recalculated daily, move the window ahead by a day each time, even if the window is a month or more long). In general, the monitoring model is the same model type as used in the baseline model (e.g., 2-parameter change-point model) because computing a difference score (block 713) depends, at least in part, on having the same number of model parameters in the two models (monitoring and baseline).

At block 711, the method 700 recalls from block 701 whether a fixed baseline model (e.g., FIG. 5) or a moving-window baseline model (e.g., FIG. 6) was selected. In alternative configurations, the method 700 includes only a single option and, thus, eliminates any necessity for making a selection. Other optional alternatives may include automating the selection and/or delaying the selection until block 711. If the fixed baseline model approach is selected, the method 700 proceeds to block 713 where the newly calculated monitoring model (i.e., the evaluation model) is compared with the baseline model using the difference score outlined below. Conversely, if the moving-window baseline model approach is selected, the method 700 proceeds to block 715, or where the newly calculated monitoring model (i.e., the evaluation model) is compared a moving baseline model whose reference period is a constant time span, but at a different time, using the difference score outlined below. In the timeline diagrams of FIGS. 8A and 8B, the times 850, 852, and 854 represent times being tested for changes in energy consumption. Though shown far apart for clarity and ease of understanding, the separation between successive test times could be as short as the output period of the model (e.g., hourly, daily, weekly, etc). The first option (block 713) provides a comparison to an absolute reference, with the advantage that it can detect slow drift in operation at the cost of being insensitive to subsequent changes. The second option (block 715) is generally unable to detect slow drift in operation, but has the advantage of being able to identify successive changes that separate periods of stable operation.

When using the moving-window baseline model approach (block 715), an additional procedure that can be employed to more accurately isolate the time of change could be carried out as follows: take the whole period spanned by the reference periods of the two models and divide the period into N intervals (e.g., 10); for each of the N+1 timepoints defined by the boundaries of the above time intervals, create a baseline model whose reference period ends on the timepoint, and a monitoring model whose reference period starts on the timepoint; compare the model coefficients using the model difference scoring system and save the difference score; the time period closest to the change in operation should be the one with the greatest difference score.

Using the above notation, the various terms are parameters of the model, and are computed based on the reference data. Associated with each of these parameters is an estimate of its uncertainty that results from a statistical t-test of the null hypothesis that the corresponding driver is unrelated to the modeled variable. This uncertainty can be expressed as $\Delta\beta_i$ and is analogous to the measurement uncertainty in a physical measurement.

Once the baseline period and monitoring period are selected according to either the fixed baseline (block 713) or the moving baseline (block 715), a difference score is computed based on the data gathered during the respective baseline period and monitoring period. The difference score is computed similarly to the discussion above with respect to Equations 2 through 4.

Upon completion of the comparisons conducted at block 713 or block 715, the difference score is compared to the difference score sensitivity threshold at block 717. When the difference score between the two models exceeds the difference score threshold, there is a significant change in the energy consumption characteristics that can't be accounted for by chance alone. If using the moving-window baseline model approach (block 715) and comparing the moving baseline model to the same model with an adjacent baseline window, the comparison would identify the time of the change as the time of maximum difference between the coefficients. As indicated at block 719, for example, an indication of anomalous energy consumption is output to a user in response to the difference score being greater than the predetermined threshold. This indication may comprise, for example, a visual indicator (e.g., a illuminating a warning lamp, generating a text alert, prompting a physical response, etc.), an audible indicator (e.g., generating an alarm), or any other known indicators reasonable for this particular purpose. The output of can be an "energy event," including a trigger for calling in energy analysis experts to localize and identify the cause and recommend a solution.

Additionally, in a monitoring operation, the reference data may be used to show how the energy load is operating currently by taking real-time measurements of the dependent variable (kilowatts) and comparing the real-time measurement to a modeled dependent variable (kilowatts) to evaluate any differences between the real and modeled readings. Adjustments may then be made to the system to address any issues that may exist regarding the operating behavior of the energy load system. Adjustments may include re-programming computer control of systems, such as the HVAC system. Likewise, differences between the real and modeled readings may be indicative of component failures in the system, and repair or replacement of the failed components may be performed to correct system performance, which would subsequently bring the real and modeled readings into agreement.

Figure 8A:
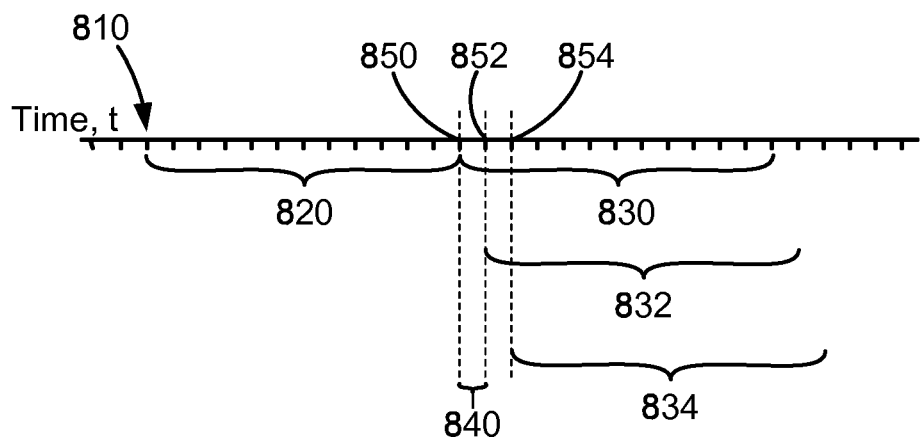
FIG. 8A illustrates a schematic timing diagram illustrating the relationship between the baseline time period and the test time periods described with reference to the flowchart of FIG. 5.
Figure 8B:
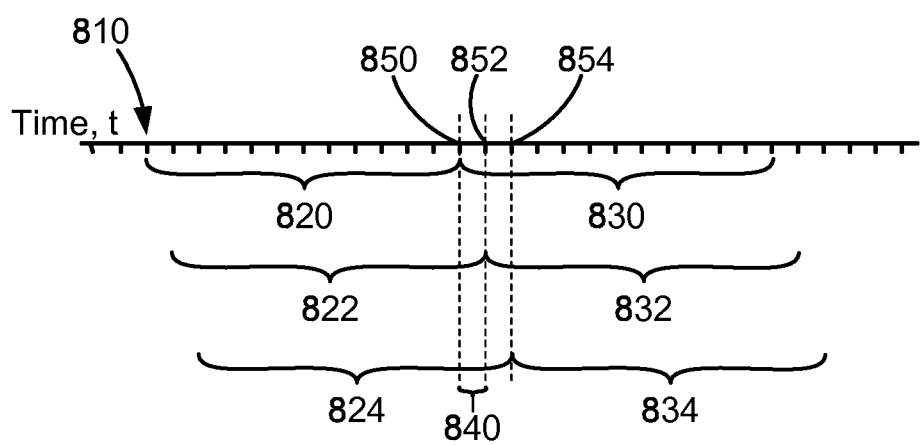
FIG. 8B illustrates a schematic timing diagram illustrating the relationship between reference time periods and the test time periods described with reference to the flowchart of FIG. 6.

FIG. 8A illustrates a schematic timing diagram illustrating the relationship between the baseline time period 820 and the test time periods 830, 832, 834 described with reference to the flowchart 500 of FIG. 5. In FIG. 8A, the baseline time period 820 spans a length of time that starts with a start time 810 and ends with a first time 850. As described above, the baseline time period is preferably a length of time providing a substantially representative range of expected values of the driver variables. The baseline time period 820 can be one year in order to ensure that seasonal temperature variations are fully experienced by the building. A first test time period 830 begins with the first time 850, such that the test time period 830 and the baseline time period 820 do not overlap. With reference to FIG. 5, data are measured during the baseline time period 820 and received by a controller (502). The data measured during the baseline time period 820 is then analyzed to create a baseline regression model (504) according to a regression analysis. Data measured during the first test time period 830 is then received at the controller (506).

A regression model is generated (512) to characterize the energy consumption of the building during the first test time period 830. The score is generated (514) and compared with a threshold (516) and a signal is optionally transmitted to indicate the generated score (518). Additional data are then received (506) until the update time interval 840 has elapsed (508). Thus, the second test time period 832 is a period of time beginning with the second time 852, and having a duration ("span") substantially similar to the first test time period 830. The data measured during the second test time period 832 is analyzed to create another regression model (512). A score is generated according to comparison between the baseline model and the newly created regression model (514), and the score is compared with the threshold (516). Similarly, a third test time period 834 begins with a third time 854 that is delayed from the second time by the update time interval 840. The three test time periods 830, 832, 834 are specifically shown for illustrative purposes, but aspects of the present disclosure apply to systems and methods utilizing far more test time periods, and be extended to an arbitrary number of test time periods.

According to one aspect of the present disclosure, a value of the score is generated periodically at the update time interval 840 (e.g., once per day). The value of the score can be generated with a point in time corresponding to the difference measured. For example, the score value corresponding to the model generated from the data measured during the first test time period 830 can be associated with the first time 850, and the score value corresponding to the model generated from the data measured during the second test time period 832 can be associated with the second time 852, etc. The respective scores can also be associated with the midpoint of the respective test time periods 830, 832, 834, etc.

Figure 9A:
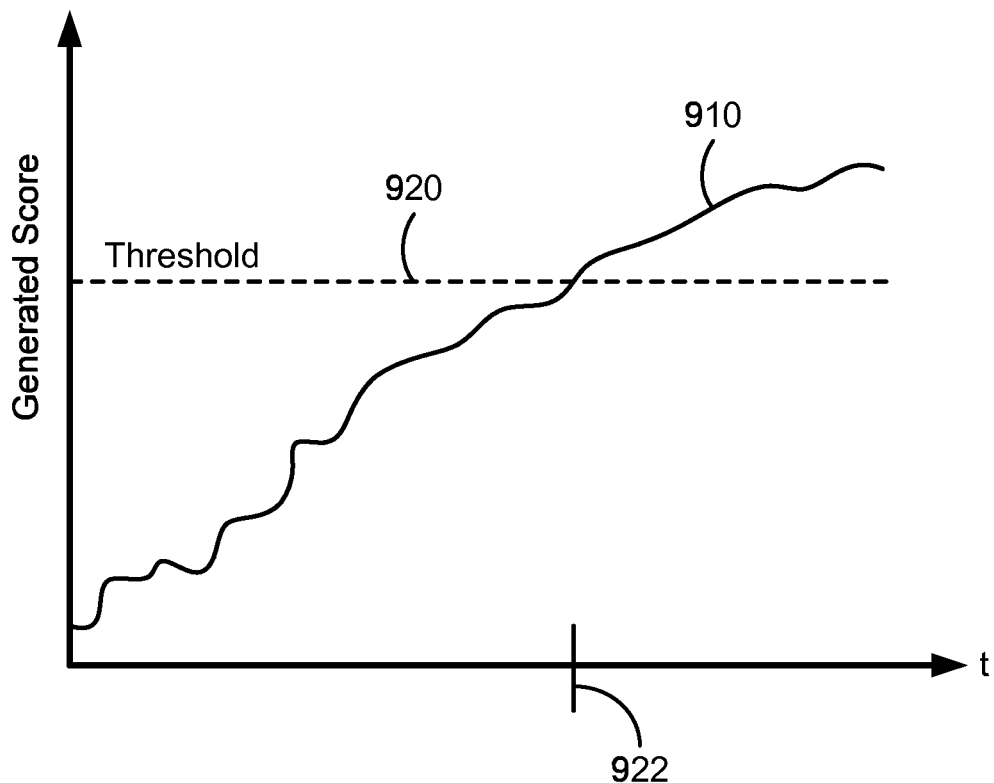
FIG. 9A illustrates an example chart of generated score versus time for a system employing the method of the flowchart of FIG. 5.

FIG. 9A illustrates an example chart of generated score versus time for a system employing the method of the flowchart 500 of FIG. 5. As shown in FIG. 9A, the successively generated values of score can be plotted against time. The generated score may gradually trend upwards (as shown by the exemplary illustrative trend line 910), toward progressively higher values until the value of score exceeds the threshold value (as shown by the exemplary illustrative threshold value indicated by the dotted line 920). The change time 922 where the generated score (indicated by the trend line 910) exceeds the threshold value (indicated by the dotted line 920) can be recorded for future reference in analyzing the cause of the shift in the energy consumption pattern. Aspects in addition to the change time 922 can be usefully employed to analyze the root cause of an observed change in an energy consumption pattern such as, for example, the rate of the observed change (sudden versus gradual). Generally selecting shorter durations for the test time periods 830, 832, 834 can allow for greater sensitivity to the timing of sudden changes in an energy consumption pattern by decreasing the relative overlap between successive test time periods. Decreasing the duration of the test time periods can also artificially increase the false alarm rate unless accompanied by a corresponding adjustment to the threshold value. Although in some embodiments the increased sensitivity to timing can also be at least partially offset by larger uncertainties associated with the computed model parameters that result from using shorter test time periods.

FIG. 8B illustrates a schematic timing diagram illustrating the relationship between reference time periods 820, 822, 824 and the test time periods 830, 832, 834 described with reference to the flowchart 600 of FIG. 6. With reference then to both FIGS. 6 and 8B, driver data and energy consumption data are received at a controller (602). Once sufficient data are received to populate data sets measured during the first baseline time period 820 and the first test time period 830 (604), regression models are created to characterize the energy consumption during the first baseline time period 820 (612) and the first test time period 830 (610). A score is then generated indicating the difference between the regression models (614) and the score is compared with a threshold value (616). Additional data are received (602) to provide measurements during the second test time period 832. The second test time period 832 is shifted relative to the first test time period 830 by the update time interval 840, so data measured during the second test time period 832 is available once the update time interval has elapsed (606). A second baseline time period 822 is also defined as being shifted by the update time interval 840 relative to the first baseline time period 820. During the second iteration through the flowchart 600, the second baseline time period 822 and the second test time period 832 are referred to as the current baseline time period and the current test time period, respectively. Thus, the regression models created (610, 612) during the second iteration of the flowchart 600 correspond to regression models characterizing the energy consumption of the structure during the second baseline time period 822 and the second test time period 832, respectively. A score is generated (614) and compared to a threshold value (616). The method shown by the flowchart 600 is then repeated iteratively so as to generate a score corresponding to the differences between models characterizing the third baseline time period 824 and the third test time period 834, and so on at each update time interval 840. Similar to the description of FIGS. 8A and 9A above, each generated score is then associated with a time (e.g., the first time 850, 852, 854) such that particular levels of the generated score are mapped to occasions in time.

Figure 9B:
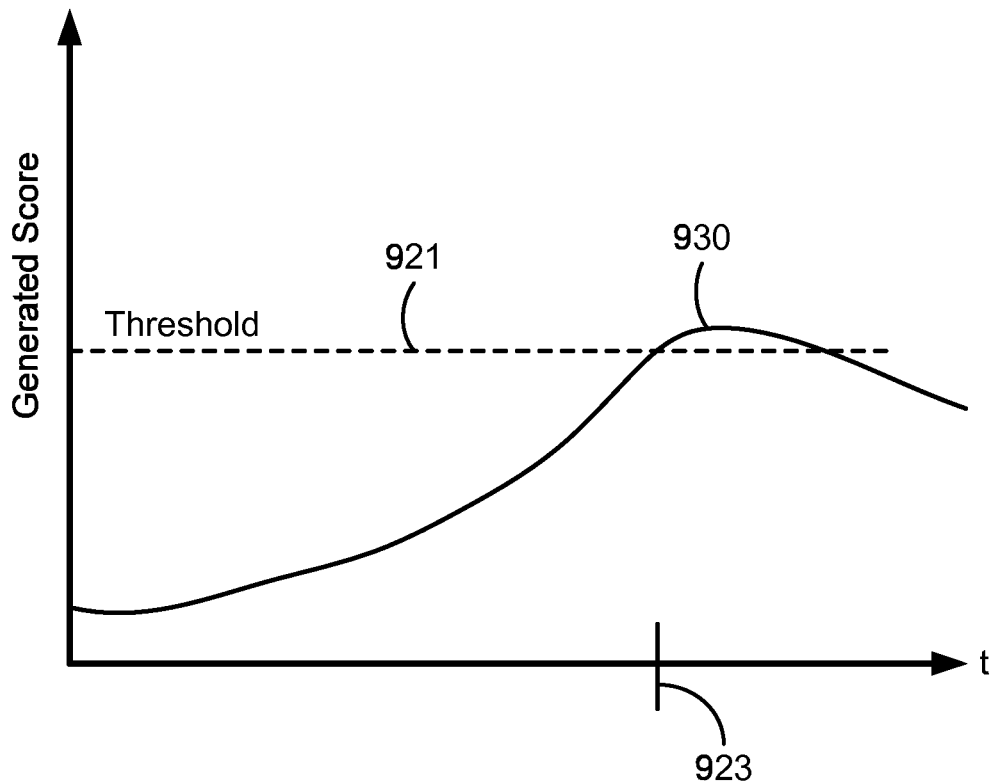
FIG. 9B illustrates an example chart of generated score versus time for a system employing the method of the flowchart of FIG. 6.

FIG. 9B illustrates an example chart of generated score versus time for a system employing the method of the flowchart 600 of FIG. 6. As shown by FIG. 9B, the generated score (indicated by the trend line 930) exceeds the threshold value 921 at the change time 923. It is noted that after the change is indicated, the generated score 930 gradually trends back downward in FIG. 9B. The trending downward reflects that the baseline time periods 820, 822, 824 are gradually shifted along with the test time periods 830, 832, 834 in the method illustrated by the flowchart 600. Therefore, eventually, such as once the test time period no longer encompasses energy consumption performance prior to the time of change in energy consumption, the "changed" energy consumption pattern will be reflected in both the baseline time period and the test time period, such that the generated score will not reflect a substantial change.

It is particularly noted that aspects of the present disclosure provide two separate systematic approaches for automatically detecting changes in the energy consumption pattern of a building. The approach illustrated by the flowchart 500 of FIG. 5 and by FIGS. 8A and 9A provides enhanced sensitivity to gradual changes in an energy consumption pattern occurring over time. The approach illustrated by the flowchart 600 of FIG. 6 and by FIGS. 8B and 9B provides enhanced sensitivity to rapid changes in an energy consumption pattern occurring suddenly. In addition, the approach illustrated by the flowchart 600 of FIG. 6 provides for accurate detection of the change time where the change occurs suddenly. The advantage of the method shown by the flowchart 600 can be understood with reference to the timing diagrams of FIGS. 8A and 8B. For example, the time of a change can correspond to a local maximum value of the generated score (which may be different from the time associated with exceeding the threshold value). For example, whereas the baseline time period 820 shown in FIG. 8A can remain static while the test time periods are shifted, with models indicative of performance during each test time period being compared to the baseline regression model, the baseline time periods 820, 822, 824 shown in FIG. 8B are constantly shifted as well such that the tested time periods each immediately follow a corresponding baseline time period.

Aspects of the present disclosure advantageously offer systems and methods for automatically and routinely identifying a change in an energy consumption pattern of a structure without requiring human intervention. An energy consumer employing aspects of the present disclosure to monitor and model energy consumption of its buildings and thereby automatically detect a change in a previously established energy consumption pattern can thereby be alerted of the change and be notified (such as by the signal 518, 618) that an investigation is warranted to correct the change in energy consumption. The energy consumer is thereby able to avoid the significant expense and undertaking of hiring consultants on an annual basis or otherwise to evaluate energy consumption, inspect physical installations, and determine whether energy consumption can be reduced cost-effectively.

During testing of methods and systems employing techniques according to the present disclosure it was discovered that a single compressor was mistakenly left operating in a large industrial environment. The single compressor accounted for approximately 1.5% of the total energy expenditures of the industrial building, which indicates a significant potential sensitivity of the techniques described herein to provide automatic detection of changes in an energy consumption pattern of a structure.

While some embodiments of the present disclosure are presented in connection with one or more energy loads housed within a structure (or multiple structures), aspects of the present disclosure are not so limited and further apply to systems and methods for automatically detecting changes in energy consumption patterns of one or more energy loads not housed within, or even associated with, a structure. For example, systems and methods employing techniques according to the present disclosure have been applied to monitoring energy consumption of individual industrial machines, (e.g., mills) in an industrial environment without accounting for influences associated with a surrounding structure associated with the industrial machines. In some examples, the detection of changes in energy consumption patterns revealed that particular cogs, gears, and/or other mechanical elements of monitored industrial equipment had become at least partially jammed and/or were experiencing increased friction such that additional energy was consumed to operate the industrial equipment.

Aspects of the present disclosure provide for monitoring an amount of energy consumption of a building, or other structure. It is specifically envisioned that the structure being modeled can be a residential, commercial, or industrial building, or a combination of such buildings. The structure can also be a mobile structure which consumes energy in a manner that is influenced by driver variables such as, for example, a boat, a train, a recreational vehicle, and the like.

While particular implementations and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of the invention as defined in the appended claims.

What is claimed is:

1. An energy monitoring system for detecting a change in an energy consumption pattern of one or more energy loads coupled to the energy monitoring system, the one or more energy loads including energy consuming systems related to one or more water, air, gas, electricity, and steam (WAGES) utilities, and the energy monitoring system comprising:
  one or more sensors for measuring a first set of data indicative of an influence on an amount of energy consumption of the one or more energy loads, the one or more sensors including one or more thermometers, wind speed detectors, or building occupancy sensors;
  one or more monitoring devices coupled to the one or more energy loads and configured to measure a second set of data indicative of the amount of energy consumption of the one or more energy loads; and
  a controller configured to:
    receive the first set of data from the one or more sensors and the second set of data from the one or more monitoring devices;
    determine a plurality of parametric variables characterizing a parametric model of the amount of energy consumption of the one or more energy loads as a function of the influence on the amount of energy consumption of the one or more energy loads, the plurality of parametric variables being determined based on the received first and second sets of data, the plurality of parametric variables having a plurality of corresponding uncertainty values, wherein the parametric model is one of a regression model and a piecewise linear model;
    determine a plurality of baseline parametric variables characterizing a baseline parametric model of energy consumption as a function of the influence on the amount of energy consumption of the one or more energy loads, wherein the baseline parametric model is one of a regression model and a piecewise linear model;

generate a score indicating the statistical significance of the difference between at least one of the determined plurality of parametric variables and at least one of the plurality of baseline parametric variables;

in response to the score exceeding a threshold, transmitting a signal indicative of the score to one or more computing devices, wherein the score indicates whether the energy consumption pattern of the one or more loads has changed;

in response to the score not exceeding the threshold, determining that the baseline parametric model is no longer accurate and needs to be updated, and generating a new parametric model in response thereto to increase accuracy of a model used to manage the energy consumption of the one or more energy loads; and manage the energy consumption of the one or more energy loads using the new parametric model by determining whether the energy consumption of the one or more energy loads can be reduced cost-effectively using the new parametric model, and in response to determining the energy consumption can be reduced cost-effectively, making one or more adjustments to the one or more energy loads to reduce the energy consumption.

2. The system according to claim 1, wherein the controller is further configured to generate the score according to differences between each of the determined plurality of parametric variables and corresponding ones of the plurality of baseline parametric variables, and according to the plurality of uncertainty values corresponding to the determined plurality of parametric variables and according to a plurality of baseline uncertainty values corresponding to the parametric baseline variables.

3. The system according to claim 1, wherein the first and second sets of data are measured during a test time period, and wherein the controller is further configured to determine the plurality of baseline parametric variables based on the first and second sets of data measured during a baseline time period preceding the test time period.

4. The system according to claim 3, wherein the baseline time period immediately precedes the test time period.

5. The system according to claim 3, wherein the baseline time period and the test time period do not overlap.

6. The system according to claim 1, wherein the first and second sets of data are measured during a test time period, and wherein the controller is further configured to automatically determine a second plurality of parametric variables at an update time interval based on third and fourth sets of data measured by the sensor and the monitor, respectively, during a second time period offset from the test time period by the update time interval.

7. The system according to claim 1, wherein the first set of data includes a plurality of measurements sampled at pre-determined time points, and wherein the second set of data includes a plurality of measurements sampled substantially coincident with the pre-determined time points.

8. The system according to claim 1, wherein the thermometers are configured to detect a temperature outside of the structure, and wherein the set of data provided by the sensors includes a set of temperatures.

9. The system according to claim 1, wherein the monitoring devices include an electrical meter, a water meter, a steam meter, a natural gas meter, or a propane meter.

10. The system of claim 1, wherein the controller is responsive to the first and second sets of data received at a first time interval to generate the baseline parametric model, and wherein the controller is responsive to the first and second sets of data received at a second, different time interval to generate the new parametric model.

11. The system of claim 10, wherein the new parametric model is generated through a regression analysis.

12. The system of claim 1, wherein the signal is used by the computing devices to display information related to differences between the baseline parametric model and the new parametric model, such as the generated score.

13. A method of detecting a change in an energy consumption pattern of a structure housing energy loads, the energy loads including energy consuming systems related to one or more water, air, gas, electricity, and steam (WAGES) utilities, the method comprising:

receiving, from one or more sensors, a first set of data indicative of an influence on an amount of energy consumption of the structure, the one or more sensors including one or more thermometers, wind speed detectors, or building occupancy sensors;

receiving, from one or more monitoring devices coupled to the one or more energy loads, a second set of data indicative of the amount of energy consumption of the structure;

determining a plurality of parametric variables that characterize a parametric model of the amount of energy consumption of the structure as a function of the influence on the amount of energy consumption of the structure, the plurality of parametric variables being determined based on the received first and second sets of data, wherein the parametric model is one of a regression model and a piecewise linear model;

determining a plurality of baseline parametric variables, the plurality of baseline parametric variables characterizing a baseline parametric model of energy consumption as a function of the influence on the amount of energy consumption of the structure, wherein the baseline parametric model is one of a regression model and a piecewise linear model;

generating a score indicating a statistical significance of the difference between at least one of the determined plurality of parametric variables and at least one of the plurality of baseline parametric variables;

in response to the score exceeding a threshold, transmitting a signal indicative of the score to one or more computing devices, wherein the score indicates whether the energy consumption pattern of the structure has changed;

in response to the score not exceeding the threshold, determining that the baseline parametric model is no longer accurate and needs to be updated, and generating a new parametric model in response thereto to increase accuracy of a model used to manage the energy consumption of the structure; and managing the energy consumption of the structure using the new parametric model by determining whether the energy consumption of the one or more energy loads in the structure can be reduced cost-effectively using the new parametric model, and in response to determining the energy consumption can be reduced cost-effectively, making one or more adjustments to the one or more energy loads to reduce the energy consumption.

14. The method according to claim 13, wherein the plurality of parametric variables are determined according to a regression analysis, and wherein the parametric model is a linear change point model, and wherein the generating the score is carried out according to a function including the determined plurality of parametric variables, the plurality of baseline parametric variables, a plurality of uncertainty values corresponding to the plurality of parametric variables, and a plurality of baseline uncertainty values corresponding to the plurality of baseline parametric variables.

15. The method according to claim 14, wherein the function for generating the score includes:
   computing a plurality of z-values, one for each of the determined plurality of parametric variables, each of the z-values being computed by:
   determining the difference between one of the determined plurality of parametric variables and a corresponding one of the plurality of baseline parametric variables, and dividing the resulting difference by a quadrature sum of the uncertainty values corresponding to the one of the determined plurality of parametric variables and the corresponding one of the plurality of baseline parametric variables;
   computing a plurality of probability values based on the plurality of z-values, one for each of the determined plurality of parametric variables, each of the plurality of probability values reflecting the likelihood that one of the determined parametric variables differs from its corresponding one of the plurality of baseline parametric variables by an amount indicative of a change in the energy consumption pattern of the structure; and
   multiplying the plurality of probability values together to determine a cumulative probability that the plurality of parametric variables collectively characterize an energy consumption pattern of the structure that differs from the baseline parametric model.

16. The method according to claim 13, wherein the first and second sets of data are measured during a test time period, the method further comprising:
   determining the plurality of baseline parametric variables based on a third set of data from the sensor and a fourth set of data from the monitor measured during a baseline time period preceding the test time period.

17. The method according to claim 16, wherein the first and second sets of data are measured during a test time period, the method further comprising:
   automatically determining a second plurality of parametric variables on an update time interval, the second plurality of parametric variables being determined based on an first updated set of data from the sensor and an second updated set of data from the monitor, the first and second updated sets of data being measured during a second test time period that is offset from the test time period by the update time interval; and
   updating the generated score to indicate the statistical significance of the difference between at least one of the determined second plurality of parametric variables and at least one of the plurality of baseline parametric variables.

18. The method according to claim 16, wherein the first and second sets of data are measured during a test time period, the method further comprising:
   automatically determining a second plurality of parametric variables on an update time interval, the second plurality of parametric variables being determined based on an first updated set of data from the sensor and an second updated set of data from the monitor, the first and second updated sets of data being measured during a second test time period that is offset from the test time period by the update time interval;
   automatically determining a second plurality of baseline parametric variables on the update time interval, the second plurality of baseline parametric variables being determined based on an third updated set of data from the sensor and an fourth updated set of data from the monitor, the third and fourth updated sets of data being measured during a second baseline time period that is offset from the baseline time period by the update time interval, the second baseline time period immediately preceding the second test time period; and
   updating the generated score to indicate the statistical significance of the difference between at least one of the determined second plurality of parametric variables and at least one of the second plurality of baseline parametric variables.

19. The method according to claim 16, wherein the measurement of the respective sets of data and updated sets of data are carried out by coincidently regularly sampling the respective influence on the amount of energy consumption of the structure and the amount of energy consumption of the structure, and wherein the baseline time period has a duration spanning a substantially representative range of possible values of the measured influence on the amount of energy consumption of the structure, and wherein the test time period has a duration less than the baseline time period, and wherein the update time interval is an interval of time less than the test time period.

20. A method of detecting a change in an energy consumption pattern of one or more energy loads, the energy loads including energy consuming systems related to one or more water, air, gas, electricity, and steam (WAGES) utilities, the method comprising:
   receiving, from one or more sensors, a first set of data indicative of an influence on an amount of energy consumption of the one or more energy loads, the one or more sensors including one or more thermometers, wind speed detectors, or building occupancy sensors;
   receiving, from one or more monitoring devices coupled to the one or more energy loads, a second set of data indicative of the amount of energy consumption of the one or more energy loads;
   determining a plurality of parametric variables that characterize a parametric model of the amount of energy consumption of the one or more energy loads as a function of the influence on the amount of energy consumption of the one or more energy loads, the plurality of parametric variables being determined based on the received first and second sets of data, wherein the parametric model is one of a regression model and a piecewise linear model;
   determining a plurality of baseline parametric variables, the plurality of baseline parametric variables characterizing a baseline parametric model of energy consumption as a function of the influence on the amount of energy consumption of the one or more energy loads, wherein the baseline parametric model is one of a regression model and a piecewise linear model;
   generating a score indicating a statistical significance of the difference between at least one of the determined plurality of parametric variables and at least one of the plurality of baseline parametric variables; and
   in response to the score exceeding a threshold, transmitting a signal indicative of the score to one or more computing devices, wherein the score indicates whether the energy consumption pattern of the one or more loads has changed;
   in response to the score not exceeding the threshold, determining that the baseline parametric model is no longer accurate and needs to be updated, and generating a new parametric model in response thereto to increase accuracy of a model used to manage the energy consumption of the one or more energy loads; and managing the energy consumption of the one or more energy loads using the new parametric model by determining whether the energy consumption of the one or more energy loads in the structure can be reduced cost-effectively using the new parametric model, and in response to determining the energy consumption can be reduced cost-effectively, making one or more adjustments to the one or more energy loads to reduce the energy consumption.

21. The method of claim 20, wherein managing the energy consumption of the one or more energy loads using the new parametric model further includes making adjustments to the system to address any issues that may exist regarding the operating behavior of the one or more energy loads.

22. The method of claim 21, wherein the adjustments include reprogramming computer control of the system.

23. The method of claim 20, wherein the monitoring devices are intelligent electronic devices (IEDs).

24. The method of claim 23, wherein the IEDs take the form of power and energy metering devices.

25. The method of claim 20, wherein the adjustments to the one or more energy loads include repairing or replacing failed components.

* * * * *